US008480236B2

(12) United States Patent
Tadachi (10) Patent No.: US 8,480,236 B2
(45) Date of Patent: Jul. 9, 2013

(54) HAVING A LIGHT CONTROL UNIT (75) Inventor: Seiji Tadachi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 13/045,054

(22) Filed: Mar. 10, 2011

(65) Prior Publication Data

US 2011/0234990 A1    Sep. 29, 2011

(30) Foreign Application Priority Data

Mar. 25, 2010    (JP) .................................. 2010-071021

(51) Int. Cl.
*G03B 21/18*    (2006.01)

(52) U.S. Cl.
USPC .................. 353/58; 353/52; 353/57; 353/61; 353/85; 353/97; 353/98; 353/119; 349/5; 361/679.48; 361/695

(58) Field of Classification Search
USPC ...... 353/57, 60, 97, 98, 88, 84, 85, 52; 349/5, 349/7–9, 10; 361/679.48, 679.55, 695, 688, 361/704, 719; 315/312, 291, DIG. 4, DIG. 7
See application file for complete search history.

(56) References Cited

U.S. PATENT DOCUMENTS

| 6,979,960 B2 * | 12/2005 | Okawa et al. ................. 315/291 |
| 7,374,289 B2 * | 5/2008 | Nakamura ....................... 353/52 |
| 2007/0285623 A1 * | 12/2007 | Kuraie ............................ 353/58 |

FOREIGN PATENT DOCUMENTS

| JP | A-2004-069966 | 3/2004 |
| JP | A-2008-180931 | 8/2008 |

* cited by examiner

*Primary Examiner* — Georgia Y Epps
*Assistant Examiner* — Sultan Chowdhury
(74) *Attorney, Agent, or Firm* — Oliff & Berridge, PLC (57) ABSTRACT

A projector includes: an illumination system which has a light source, and a light control unit opened and closed to shield a part of light emitted from the light source; a light modulation device illuminated by illumination light received from the illumination system; an air supply device which supplies air to the light control unit and the light modulation device; and an air supply control unit which decreases an air supply amount to the light modulation device when increasing an air supply amount to the light control unit in accordance with a relatively closed condition of the light control unit.

4 Claims, 6 Drawing Sheets

HAVING A LIGHT CONTROL UNIT

BACKGROUND

1. Technical Field

The present invention relates to a projector which includes a light control device which shields illumination light for controlling the amount of the illumination light, and an air supply device which cools the light control device.

2. Related Art

Currently, such a projector which controls the amount of illumination light by using a light control device equipped with an openable and closable light control member and disposed between a pair of lens arrays contained in an illumination device is widely known (for example, see JP-A-2004-69966 and JP-A-2008-180931). Some types of this light control device generate heat relatively easily. Thus, there is a technology currently known which cools the light control device by using a fan (see JP-A-2008-180931).

According to this technology, however, noise generated by the fan increases as the amount of air supply from the fan rises for cooling the light control device and other mechanisms within the projector. Particularly when the amount of light shield by the light control device is large, the quantity of heat release increases. In this case, a larger amount of air supply is needed for cooling the light control device.

SUMMARY

An advantage of some aspects of the invention is to provide a projector capable of maintaining an appropriate cooling condition within a device by using a fan, and preventing noise increase produced by raising the amount of air supply from the fan.

A projector according to a first aspect of the invention includes: an illumination system which has a light source, and a light control unit opened and closed to shield a part of light emitted from the light source; a light modulation device illuminated by illumination light received from the illumination system; an air supply device which supplies air to the light control unit and the light modulation device; and an air supply control unit which decreases an air supply amount to the light modulation device when increasing an air supply amount to the light control unit in accordance with a relatively closed condition of the light control unit.

According to this projector, the air supply control unit decreases the air supply amount to the light modulation device when increasing the air supply amount supplied from the air supply device to the light control unit in accordance with the relatively closed condition of the light control unit. By this method, the light control unit whose temperature is easily raised due to the raised light shield is effectively cooled such that an appropriate cooling condition can be maintained within the device. Moreover, increase in the entire operational volume of the air supply device is reduced, which prevents noise increase caused by the raised operational volume.

According to a specific aspect of the invention, the air supply control unit increases the air supply amount to the light modulation device when decreasing the air supply amount to the light control unit in accordance with a relatively opened condition of the light control unit. In this case, the light modulation device whose temperature is easily raised due to the raised illumination is effectively cooled such that an appropriate cooling condition can be maintained within the device. Moreover, increase in the entire operational volume of the air supply device is reduced, which prevents noise increase caused by the raised operational volume.

According to another aspect of the invention, the air supply device has a first air supply device for supplying air to the light control unit, and a second air supply device for supplying air to the light modulation device. In this case, the air supply amount to the light control unit can be controlled by the first air supply device, and the air supply amount to the light modulation device can be controlled by the second air supply device.

According to still another aspect of the invention, the air supply control unit controls the air supply amount to the light control unit and the air supply amount to the light modulation device by adjusting voltage applied to the first air supply device and voltage applied to the second air supply device. In this case, the air supply amounts to the light control unit and to the light modulation device can be relatively easily and securely controlled by voltage control.

According to yet another aspect of the invention, the air supply device has a duct including an air supply branching unit which branches air supplied from one air supply source into a first air supply path for supplying air toward the light control unit and a second air supply path for supplying air toward the light modulation device, and a control valve disposed at the air supply branching unit to control air supply toward the first and second air supply paths. In this case, the branching ratio of the air supply amounts from the one air supply source to the light control unit and to the light modulation device can be easily inverted by controlling the direction of the control valve.

According to still yet another aspect of the invention, the air supply control unit maintains a substantially constant power consumption of the air supply device. In this case, the noise generated from the entire air supply device can be easily and securely reduced to a certain limited range.

According to further another aspect of the invention, the light source included in the illumination system switches between a high luminance priority mode and a power saving mode for operation, and the air supply control unit controls the air supply amounts to the light control unit and to the light modulation device when operating at least in the high luminance priority mode. In this case, the cooling condition within the device produced by the air supply device can be appropriately maintained, and noise increase can be prevented in the high luminance priority mode in which the relatively high power consumption produces high brightness but easily increases the temperature.

A projector according to a second aspect of the invention includes: an illumination system which has a light source, and a light control unit opened and closed to shield a part of light emitted from the light source; a light modulation device illuminated by illumination light received from the illumination system; and an air supply device which supplies air to the light control unit and the light modulation device. An air supply amount from the air supply device to the light control unit becomes larger than before increase of a light shield amount of the light control unit when the light shield amount of the light control unit increases, and an air supply amount from the air supply device to the light modulation device becomes smaller than before increase of the light shield amount of the light control unit when the light shield amount of the light control unit increases.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector according to a first embodiment of the invention is hereinafter described in detail with reference to the drawings.

A. General Structure of Projector

Figure 1:
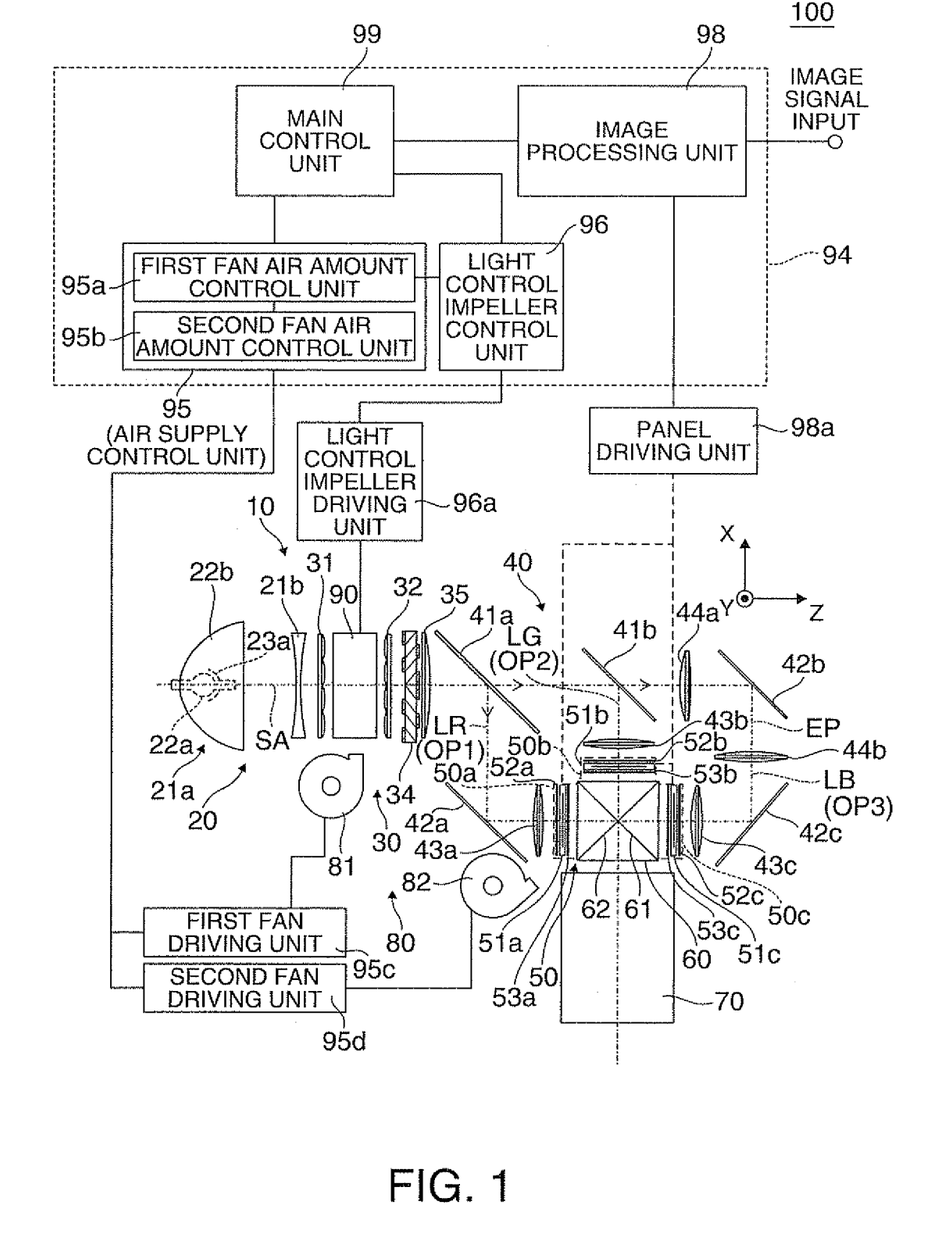
FIG. 1 is a plan view illustrating a concept of a projector according to a first embodiment.

As illustrated in FIG. 1, a projector 100 in this embodiment includes an illumination device 10, a light control device 90, an air supply device 80, a color separation and light guide unit 40, a light modulation unit 50, a color combining unit 60, a projection system 70, and a control device 94. The air supply device 80 has a first fan 81 as a first air supply device for cooling the light control device 90, and a second fan 82 as a second air supply device for cooling the light modulation unit 50. The control device 94 has a main control unit 99 for controlling the overall operation, an air supply control unit 95 for controlling the air supply device 80, and others.

The illumination device 10 is an illumination system containing a light source lamp unit 20 and an equalizing system 30.

The light source lamp unit 20 of the illumination device 10 has a lamp unit 21a and a concave lens 21b as a light source. The lamp unit 21a has an arc tube 22a constituted by a high-pressure mercury lamp or others, and an ellipsoidal concave mirror 22b which reflects light emitted from the arc tube 22a toward the front. The concave lens 21b has a function of converting illumination light received from the lamp unit 21a into light substantially parallel with a system optical axis SA, and can be eliminated when the concave mirror 22b is a parabolic mirror, for example.

The equalizing system 30 has first and second lens arrays 31 and 32, a polarization converting member 34, and a stacking lens 35.

Each of the first and second lens arrays 31 and 32 is a fly-eye lens constituted by a plurality of element lenses disposed in matrix in an X direction and a Y direction, for example. The illumination light emitted from the light source lamp unit 20 is divided into a plurality of partial lights by the function of the plural element lenses constituting the first lens array 31. The respective partial lights coming from the first lens array 31 are released at appropriate divergent angles by the function of the plural element lenses constituting the second lens array 32.

The polarization converting member 34 as a rectangular flat plate member generally extending in parallel with an X-Y plane contains a plurality of polarization converting elements. These polarization converting elements constituted by PBS prism arrays or the like and extending in the Y direction as their longitudinal direction are disposed in a line in the X direction to form the polarization converting member 34. The polarization converting member 34 converts the illumination light received from the lens array 32 into only linearly polarized light in a particular direction, and supplies the converted light to the subsequent optical system.

The stacking lens 35 generally converges the illumination light received from the second lens array 32 via the polarization converting member 34 in an appropriate manner to provide stack illumination on liquid crystal light valves 50a, 50b, and 50c for respective colors equipped on the light modulation unit 50 as a light modulation device.

The equalizing system 30 having this structure equalizes the illumination light emitted from the light source lamp unit 20 as the light source through division and stack to provide illumination on the liquid crystal light valves 50a, 50b, and 50c for the respective colors equipped on the light modulation unit 50 by using the illumination light thus divided and stacked. Therefore, the illumination device 10 emits illumination light in a condition appropriate for forming projection images to be projected by the projector 100.

Figure 2:
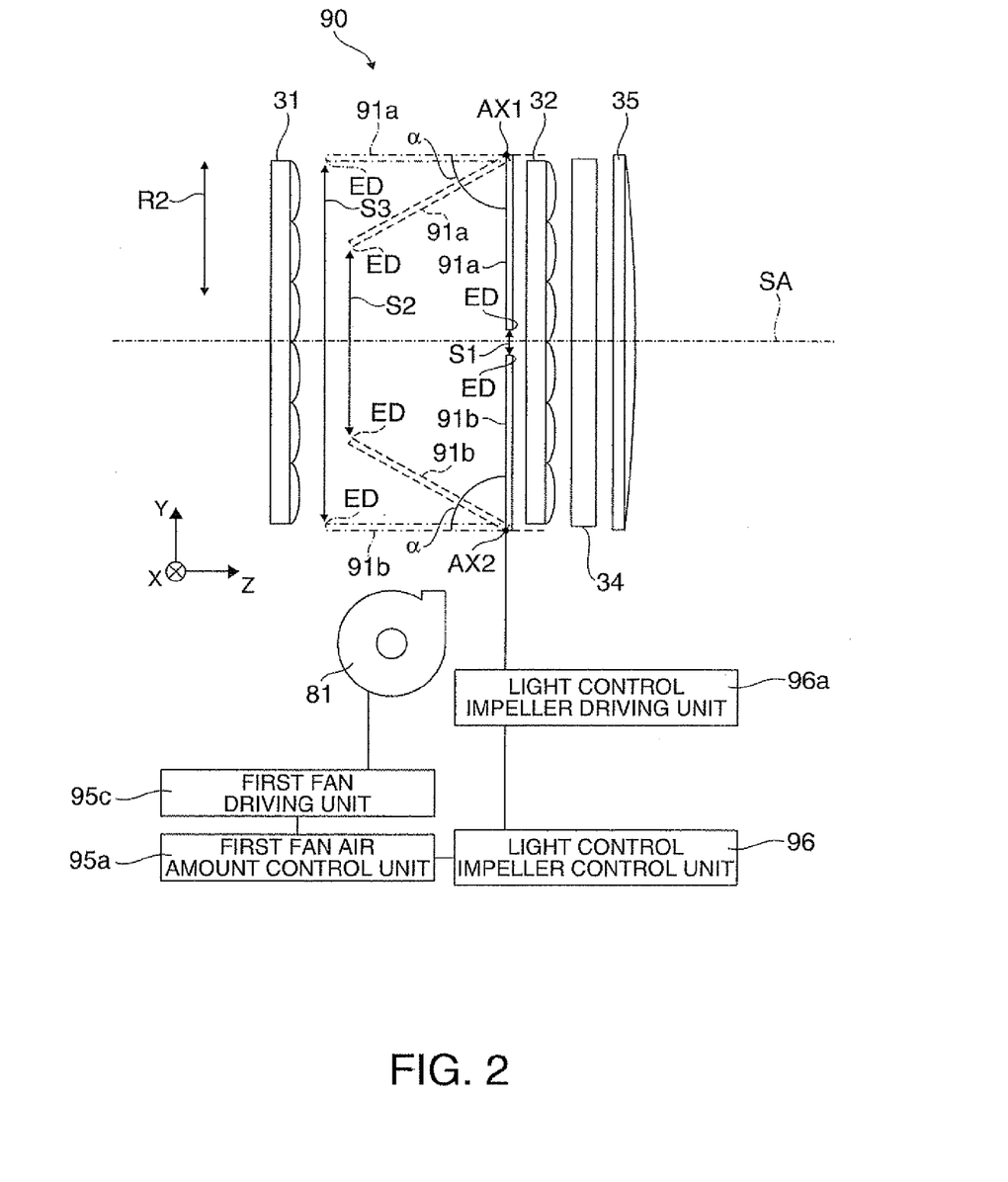
FIG. 2 is a plan view illustrating a light control device.
Figure 3A:
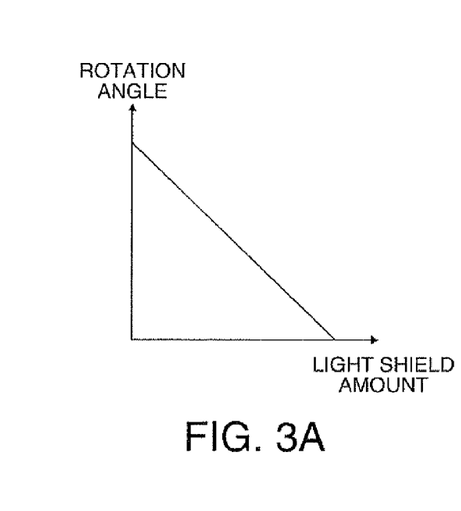
FIG. 3A is a graph showing the relationship between the light shield amount of the light control device and the rotation angles of light control impellers.

The light control device 90 shown in FIGS. 1 and 2 as a light control unit for controlling a light shield amount has a pair of first and second light control impellers 91a and 91b disposed between the first lens array 31 and the second lens array 32, for example. As can be seen from FIG. 2, the first light control impeller 91a is located on the +Y side with respect to the system optical axis SA, and the second light control impeller 91b is located on the −Y side with respect to the system optical axis SA. The pair of the first and second light control impellers 91a and 91b are driven by a light control impeller driving unit 96a to rotate outward around axes AX1 and AX2 as their rotation axes in synchronization with each other. The light control device 90 having this structure operates like an aperture which has an open/close direction R2 corresponding to the Y direction to increase and decrease the amount of the illumination light emitted from the illumination device 10. More specifically, the light control device 90 switches between a full-close condition in which both the light control impellers 91a and 91b are completely closed as indicated by solid lines in FIG. 2 for the maximum light shield of the illumination light (maximum light shield condition), an open condition in which the light control impellers 91a and 91b are opened to some extent as indicated by broken lines in FIG. 2, and a full-open condition in which the light control impellers 91a and 91b are completely opened as indicated by alternate long and short dash lines in FIG. 2 (minimum light shield condition) to control the amount of light shield. Thus, the light control device 90 can control the light passing area in the open/close direction R2 in the range between ends ED of the light control impellers 91a and 91b, i.e., between opening widths S1 through S3 as illustrated in the figure. In the maximum light shield condition corresponding to the opening width S1, the light shield amount produced by the light control device 90 becomes the maximum, in which condition the temperatures of the light control impellers 91a and 91b rise most easily. On the other hand, under the minimum light shield condition corresponding to the opening width S3, the light shield amount produced by the light control device 90 becomes the minimum, in which condition the temperatures of the light control impellers 91a and 91b rise little. The amount of the light shield by using the light control impellers 91a and 91b are specified by the rotation angles of the light control impellers 91a and 91b around the axes AX1 and AX2. More specifically, assuming that the maximum light shield condition has a reference rotation angle of 0 degree, the light shield amount decreases as the rotation angle increases as shown in a graph in FIG. 3A. In the minimum light shield condition where a rotation angle α is approximately 90 degrees, the light shield amount becomes zero. In the control of the light shield amount, both the light control impellers 91a and 91b continuously rotate, and thus the light shield amount successively varies. The light control device 90 operates in the manner described above in response to driving signals received from a light control impeller driving unit 96a in accordance with video scenes of dynamic images being projected, for example, so as to contribute to improvement of dynamic contrast.

Returning to FIG. 1, in the air supply device 80, the first fan 81 as the first air supply device is constituted by a sirocco fan, for example, and operates according to driving signals received from a first fan driving unit 95c of the air supply control unit 95 to cool the light control device 90. The light control device 90 is located on the optical path upstream side in such a position that the distance between the light control device 90 and the light source lamp unit 20 is shorter than the distance between the light modulation unit 50 and others and the light source lamp unit 20. In this arrangement, the light control device 90 absorbs intensive beams or is subject to other effects during light shield, and thus absorbs a large quantity of heat. In this case, under the minimum light shield condition of the light control device 90, only a small amount of air supply or no air supply is needed. However, under the maximum light shield condition of the light control device 90, for example, the amount of heat absorption becomes extremely large, which requires the first fan 81 to raise the air supply amount. Therefore, as will be described later in detail, a first fan air amount control unit 95a of the air supply control unit 95 obtains information from a light control impeller control unit 96 and controls the air amount of the first fan 81 via the first fan driving unit 95c based on the light shield amount of the light control device 90.

The color separation and light guide unit 40 disposed on the optical path downstream side with respect to the equalizing system 30 includes first and second dichroic mirrors 41a and 41b, reflection mirrors 42a, 42b, and 42c, three field lenses 43a, 43b, and 43c, and relay lenses 44a and 44b, and has functions of separating illumination light emitted from the illumination device 10 into three color lights in red (R), green (G), and blue (B), and guiding the respective color lights to the subsequent liquid crystal light valves 50a, 50b, and 50c. More specifically, the first dichroic mirror 41a reflects R color illumination light LR included in the three color lights in R, G, and B colors and transmits illumination lights LG and LB in G and B colors. The second dichroic mirror 41b reflects the illumination light LG in G color of the two color lights in G and B colors and transmits the illumination light LB in B color. That is, the red light LR reflected by the first dichroic mirror 41a is guided toward a red optical path OP1 having the field lens 43a, the green light LG transmitted by the first dichroic mirror 41a and reflected by the second dichroic mirror 41b is guided toward a green optical path OP2 having the field lens 43b, and the blue light LB transmitted by the second dichroic mirror 41b is guided toward a blue optical path OP3 having the field lens 43c. The incident angles of the field lenses 43a, 43b, and 43c for the respective colors are controlled such that the respective partial lights entering the light modulation unit 50 after leaving the second lens array 32 and traveling through the stacking lens 35 and others have appropriate degrees of convergence or divergence with respect to the system optical axis SA on the light receiving areas of the liquid crystal light valves 50a, 50b, and 50c.

The light modulation unit 50 is a light modulation device illuminated by the three color illumination lights LR, LG, and LB separated from the illumination light, and has the three liquid crystal light valves 50a, 50b, and 50c receiving the three color illumination lights LR, LG, and LB, respectively. The liquid crystal light valves 50a, 50b, and 50c have liquid crystal panels 51a, 51b, and 51c disposed at the centers, entrance side polarization filters 52a, 52b, and 52c on the optical path upstream side, and exit side polarization filters 53a, 53b, and 53c on the optical path downstream side with the liquid crystal panels 51a through 51c interposed between the filters 52a through 52c and 53a through 53c. The intensities of the respective color lights LR, LG, and LB having entered the liquid crystal light valves 50a, 50b, and 50c are modulated by pixel according to driving signals or control signals inputted as electric signals to the liquid crystal light valves 50a, 50b, and 50c. Each of the liquid crystal panels 51a, 51b, and 51c is a transmission-type liquid crystal panel, and has a not-shown light transmission type entrance side substrate having transparent electrodes and others, a not-shown light transmission type driving substrate having pixel electrodes and others, and a not-shown liquid crystal layer sealed between the entrance side substrate and the driving substrate.

The color combining unit 60 is a cross dichroic prism for synthesizing a color image. The color combining unit 60 contains a first dichroic film 61 for reflecting the R light, and a second dichroic film 62 for reflecting the B light disposed in an X shape in the plan view. The color combining unit 60 reflects the red light LR received from the liquid crystal light valve 50a toward the right with respect to the traveling direction by using the first dichroic film 61, releases the green light LG received from the liquid crystal light valve 50b in the traveling direction without directional change by using both the dichroic films 61 and 62, and reflects the blue light LB received from the liquid crystal light valve 50c toward the left with respect to the traveling direction by using the second dichroic film 62.

The second fan 82 as the second air supply device included in the air supply device 80 is constituted by a sirocco fan, for example. The second fan 82 chiefly cools the light modulation unit 50 and the like which receive stacked lights and thus is affected relatively greatly by heat generated while receiving the lights in the optical systems positioned on the optical path downstream side with respect to the equalizing system 30, according to driving signals transmitted from a second fan driving unit 95d. A second fan air amount control unit 95b indirectly acquires information about the light control impeller control unit 96 from the first fan air amount control unit 95a, and controls the air amount of the second fan 82 via the second fan driving unit 95d in accordance with the light shield amount by the light control device 90. This mechanism will be described later in detail.

The projection system 70 as a projection lens projects the image light synthesized by the color combining unit 60 onto a screen (not shown) as a color image.

The control device 94 includes an image processing unit 98 to which external image signals such as video signals are inputted, the light control impeller control unit 96 for controlling the opening and closing condition of the light control device 90 via the light control impeller driving unit 96a, the air supply control unit 95 for controlling the air supply device 80, and the main control unit 99 for controlling the operations of these units.

The image processing unit 98 performs image processing such as correction for the inputted external image signals to produce image signals. A panel driving unit 98a generates driving signals for controlling the conditions of the liquid crystal light valves 50a, 50b, and 50c based on the image signals after image processing outputted from the image processing unit 98.

The light control impeller control unit 96 controls the light control device 90 via the light control impeller driving unit 96a such that the light control device 90 can open and close as necessary according to video scenes and the like processed by the image processing unit 98. In addition, the light control impeller control unit 96 constantly transmits the operational state of the light control device 90 to the air supply control unit 95.

The air supply control unit 95 includes the first fan air amount control unit 95a for controlling the air supply amount of the first fan 81 via the first fan driving unit 95c, and the second fan air amount control unit 95b for controlling the air supply amount of the second fan 82 via the second fan driving unit 95d. The first fan air amount control unit 95a determines the air supply amount of the first fan 81 based on the information about the light shield condition received from the light control impeller control unit 96, and transmits a signal for allowing the first fan 81 to operate with the determined air supply amount to the first fan driving unit 95c. Moreover, the first fan air amount control unit 95a transmits a signal specifying the air supply amount of the first fan 81 to the second fan air amount control unit 95b. The second fan air amount control unit 95b determines the air supply amount of the second fan 82 based on the signal received from the first fan air amount control unit 95a, and transmits a signal for allowing the second fan 82 to operate with the determined air supply amount to the second fan driving unit 95d. In this embodiment, the air supply control unit 95 controls the air supply amount to the light control device 90 and the air supply amount to the light modulation unit 50 by adjusting the voltage applied to the first fan 81 and the voltage applied to the second fan 82 as an example method. In this case, the air supply control unit 95 keeps the total power consumption of the first and second fans 81 and 82 as a whole, that is, the entire air supply device 80 substantially constant. By this method, the noise generated by the first and second fans 81 and 82 as a whole can be constantly reduced regardless of the operational condition of the light control device 90.

The main control unit 99 operates under appropriate programs prepared for controlling the air supply control unit 95, the light control impeller control unit 96, the image processing unit 98 and others.

B. Explanation of Air Supply Control by Air Supply Control Unit

Figure 3B:
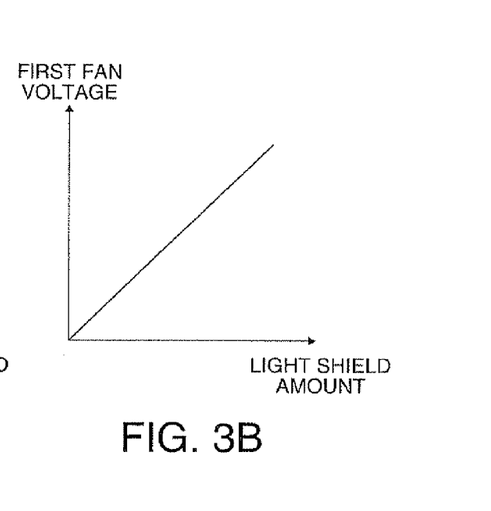
FIGS. 3B through 3D are graphs showing the relationship between the light shield amount and the conditions of an air supply device such as voltage applied thereto.

The control of the air supply by the air supply control unit 95, that is, by the first and second fan air amount control units 95a and 95b is more specifically explained. The first fan air amount control unit 95a of the air supply control unit 95 obtains information about the light shied amount of the light control device 90 from the light control impeller control unit 96. More specifically, the first fan air amount control unit 95a obtains information about the rotation angles of the light control impellers 91a and 91b provided for determining the light shield amount as illustrated in FIG. 2. As carne seen from FIG. 2, the light shield amount becomes the maximum when the rotation angles of the light control impellers 91a and 91b are the minimum angle of zero degree, and becomes the minimum when the rotation angles are approximately 90 degrees. This relationship between the light shield amount and the rotation angle is shown in a graph in FIG. 3A. For cooling the light control device 90 under this condition without loss, it is preferable that the air supply amount from the first fan 81 increases when the light control impellers 91a and 91b are relatively closed, and decreases when the light control impellers 91a and 91b are relatively opened. Thus, as shown in FIG. 3B, the first fan air amount control unit 95a controls the voltage applied to the first fan 81 in such a manner as to increase the voltage as the light shield amount by the light control device 90 becomes larger, that is, the rotation angles become smaller. In this embodiment, it is assumed that the voltage continuously varies in accordance with the successive change of the rotation angles. By this control, the light control device 90 can be constantly brought into an appropriate cooling condition during operation by the function of the first fan 81.

Figure 3C:
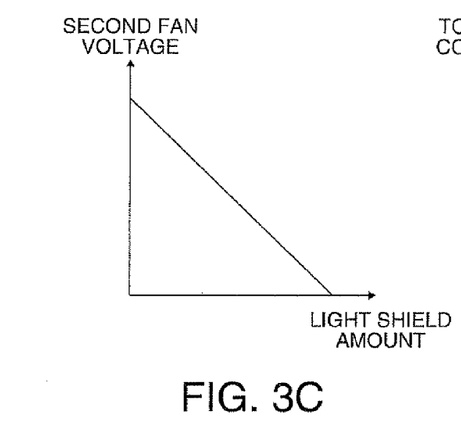

On the other hand, as shown in a graph in FIG. 3C, the second fan air amount control unit 95b controls the voltage applied to the second fan 82 in such a manner as to decrease the voltage as the light shield amount by the light control device 90 becomes larger, that is, the rotation angles become smaller. In other words, the second fan air amount control unit 95b controls the air supply amount of the second fan 82 in such a manner as to decrease the air supply amount when the light control impellers 91a and 91b are relatively closed, and increase the amount when the light control impellers 91a and 91b are relatively opened.

Figure 3D:
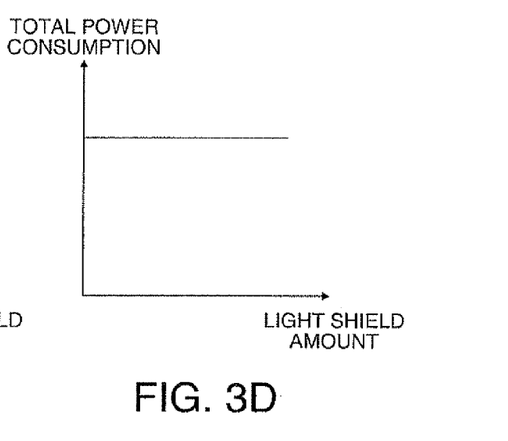

Accordingly, the air supply control unit 95 controls the voltages applied to the first and second fans 81 and 82 such that the voltage to the second fan 82 decreases as the voltage to the first fan 81 increases, and that the voltage to the second fan 82 increases as the voltage to the first fan 81 decreases. By this control, the total power consumption of the first and second fans 81 and 82 as a whole is kept substantially constant as shown in FIG. 3D, and the noise generated by the air supply device 80 is stabilized regardless of the operation condition of the light control device 90.

The heat release generated by light applied to the respective parts within the device, and the relationship between the heat release and the control of cooling provided by the air supply described above are now explained. Initially, when the light shield amount by the light control device 90 is large under the closed condition of the light control impellers 91a and 91b, the heat release amount from the light control device 90 produced by absorption of the received light by the light control device 90 relatively increases. In this case, the level of cooling for the light control device 90 by the first fan 81 needs to be raised. On the other hand, the amount of light applied to the light modulation unit 50 and others disposed on the optical path downstream side from the light control device 90 decreases in accordance with the rise of the light shield amount by the light control device 90. In this case, the heat generation from the light modulation unit 50 side by the light applied thereto becomes relatively small, which requires only relatively low-level cooling for the light modulation unit 50 side by the second fan 82. On the contrary, when the light shield amount by the light control device 90 is small under the opened condition of the light control impellers 91a and 91b, only relatively low-level cooling for the light control device 90 by the first fan 81 is needed. In this case, the amount of the light applied to the light modulation unit 50 side increases in accordance with the reduction of the light shield amount by the light control device 90. As a result, the heat release amount from the light modulation unit 50 side generated by absorption of the light applied thereto becomes relatively large, which requires increase in the cooling operation for the light modulation unit 50 side by the second fan 82. The air supply control unit 95 performs control considering these conditions on the light control device 90 side and the light modulation unit 50 side such that the air supply amount of the second fan 82 decreases as the air supply amount of the first fan 81 increases, and that the air supply amount of the first fan 81 decreases as the air supply amount of the second fan 82 increases. Accordingly, the interior of the device can be maintained in an appropriate cooling condition even when the total power quantity is kept substantially constant.

According to the projector 100 in this embodiment, therefore, the air supply control unit 95 decreases the air supply amount to the light modulation unit 50 when increasing the air supply amount to the light control device 90 supplied by the air supply device 80 based on the relatively closed conditions of the first and second light control impellers 91a and 91b of the light control device 90. In other words, when the light shield amount of the light control device 90 increases, the air supply amount from the air supply device 80 to the light control device 90 is controlled in such a manner as to become larger than before increase of the light shield amount of the light control device 90. On the other hand, when the light shield amount of the light control device 90 increases, the air supply amount from the air supply device 80 to the light modulation unit 50 is controlled in such a manner as to become smaller than before increase of the light shield amount of the light control device 90. By this method, the light control device 90 whose temperature is easily raised is effectively cooled such that an appropriate cooling condition can be maintained within the device. Moreover, increase in the entire operational volume of the air supply device 80 is reduced, which prevents noise increase caused by the raised air supply amount of the air supply device 80.

On the other hand, the air supply control unit 95 increases the air supply amount to the light modulation unit 50 when decreasing the air supply amount to the light control device 90 produced by the air supply device 80 based on the relatively opened conditions of the first and second light control impellers 91a and 91b of the light control device 90. By this method, the light modulation unit 50 whose temperature is easily raised is effectively cooled such that an appropriate cooling condition can be maintained within the device. Moreover, increase in the operational volume of the entire air supply device 80 is reduced, which prevents noise increase caused by the raised air supply amount of the air supply device 80.

Furthermore, according to the structure which increases and decreases the air supply amounts of the first and second fans 81 and 82 constituting the air supply device 80 in accordance with the opening and closing operations of the first and second light control impellers 91a and 91b as described above, the cooling condition within the device by the functions of the first and second fans 81 and 82 can be appropriately maintained regardless of the operational state of the light control device 90 which operates as necessary according to video scenes and the like. In this case, increase in the operational volume of the entire air supply device 80 is reduced, which prevents noise increase.

D. Modified Example of First Embodiment

A projector 200 as a modified example of the first embodiment is now described with reference to FIG. 4. The projector 200 in this modified example has a structure similar to that of the first projector 100 shown in FIG. 1 except for the constructions of the light source lamp unit 20 and a control device 194, and the detailed explanation of the similar parts is not repeated.

Figure 4:
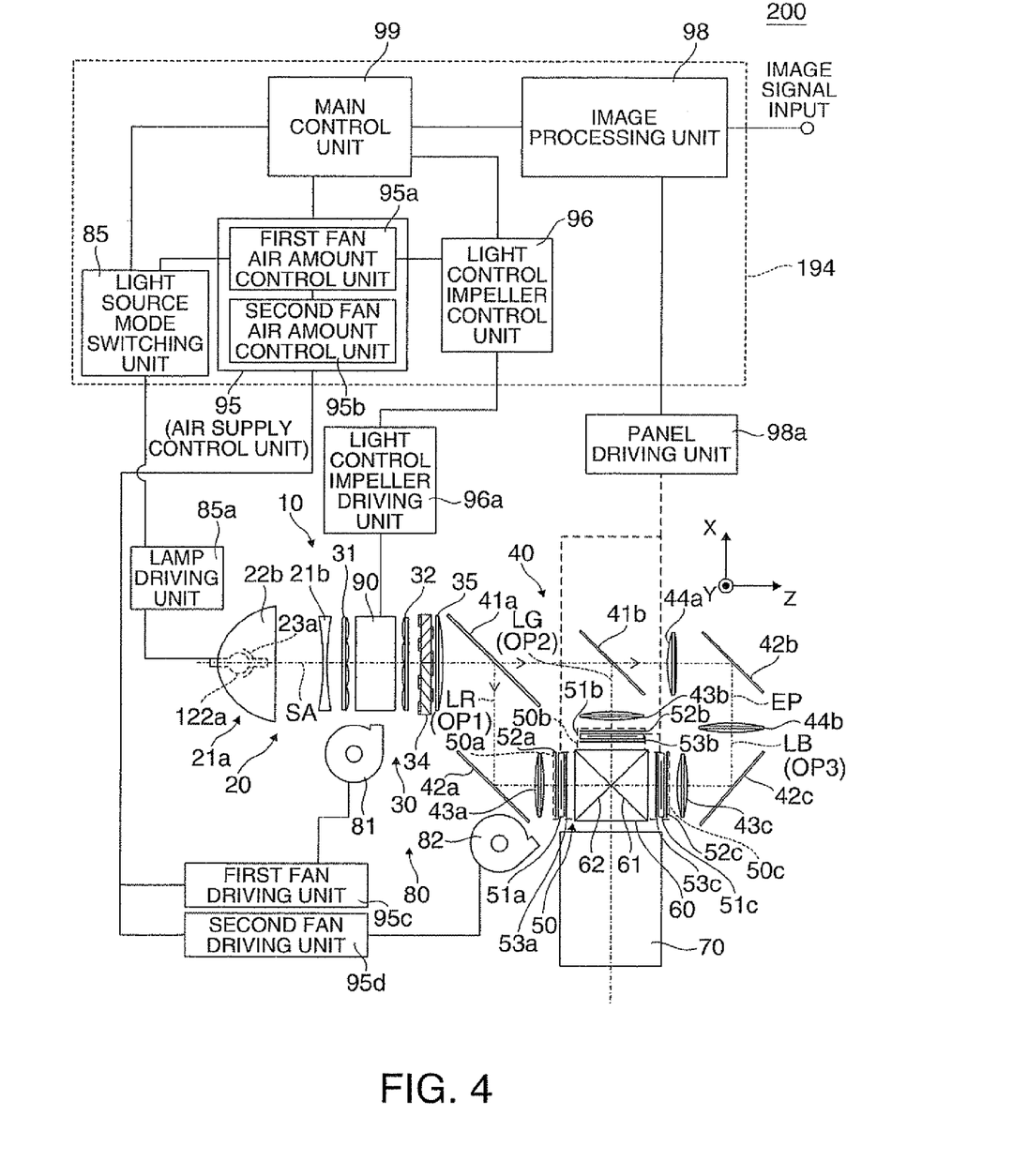
FIG. 4 is a plan view illustrating a concept of a projector according to a modified example.

The lamp unit 21a included in the light source lamp unit 20 of the projector 200 shown in FIG. 4 switches in operation between a high luminance priority mode which consumes relatively high power and gives priority to brightness and a power saving mode which consumes relatively low power. The control device 194 further includes a light source mode switching unit 85 for switching the respective modes of the lamp unit 21a.

The light source mode switching unit 85 of the control device 194 selects either of the modes discussed above for image projection according to the selection by a user, and allows a lamp driving unit 85a to provide illumination corresponding to the selected mode. The lamp driving unit 85a causes the lamp unit 21a to emit light for producing illumination corresponding to the operation condition appropriate for the selected mode. The light source mode switching unit 85 transmits the result of the determined mode to the first fan air amount control unit 95a of the air supply control unit 95.

The first fan air amount control unit 95a obtains information about the respective modes from the light source mode switching unit 85, and controls air supply in accordance with the respective modes based on the obtained information. For example, it is considered that adjustment of the air supply amount corresponding to the opening and closing condition of the light control device 90 as in the first embodiment is conducted only in the high luminance priority mode expected to increase the temperature of the light control device 90 relatively easily. In case of the power saving mode expected to increase the temperature of the light control device 90 relatively more moderately than the high luminance priority mode, the entire system may be uniformly cooled by the normal air supply control which supplies air at a constant rate regardless of the opening and closing condition of the light control device 90, for example. Moreover, the ratio of increase and decrease of the air supply amount corresponding to the opening and closing condition of the light control device 90 may be changed in accordance with the respective modes.

Second Embodiment

A projector according to a second embodiment of the invention is now described with reference to FIG. 5 and other figures. A projector 300 in this embodiment is a modified example of the projector 100 in the first embodiment shown in FIG. 1, and the structure not particularly explained herein is similar to the structure in the first embodiment except for the constructions of an air supply control unit 295 of a control device 294, and an air supply device 180.

Figure 5:
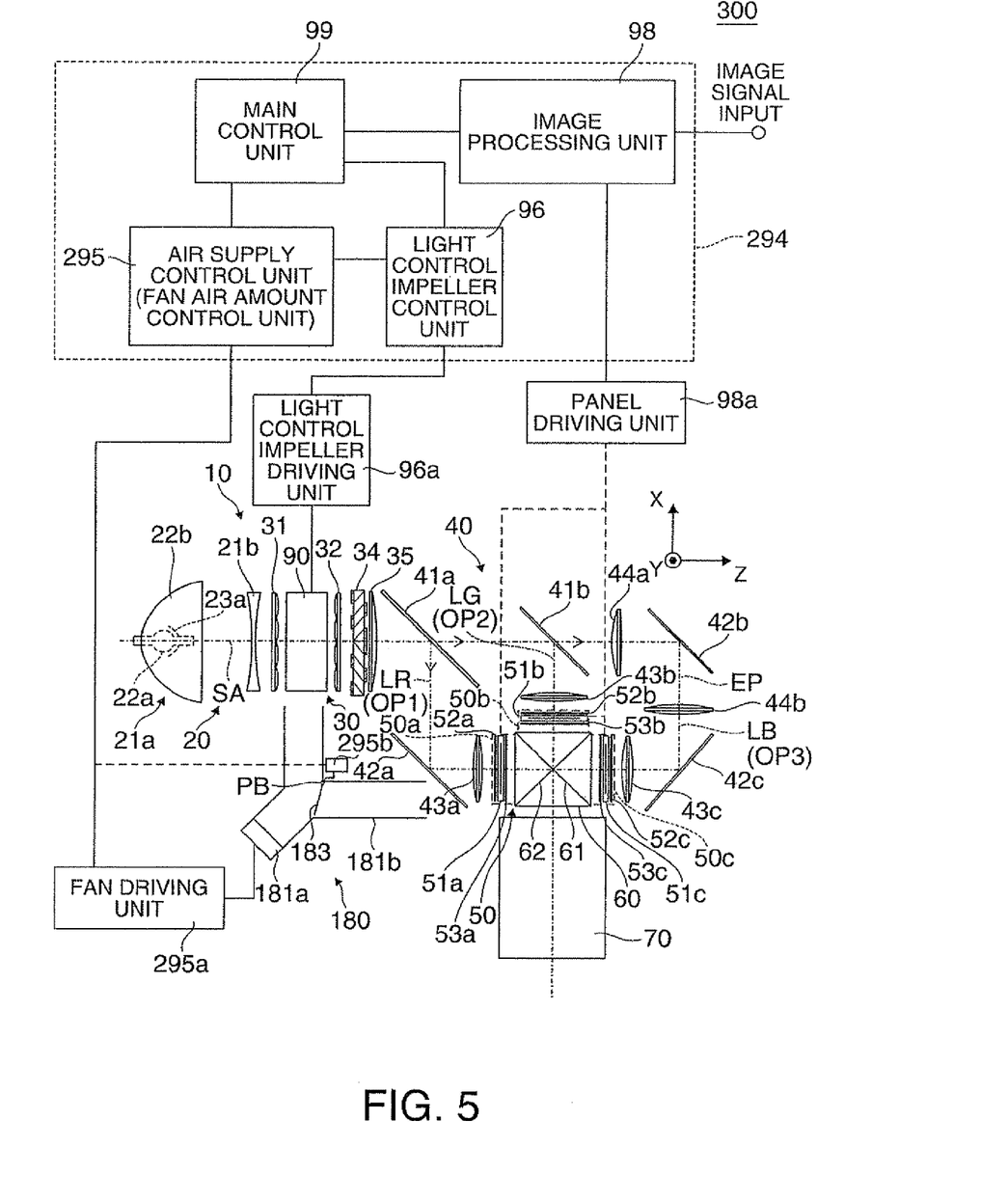
FIG. 5 is a plan view illustrating a concept of a projector according to a second embodiment.

The air supply device 180 included in the projector 300 shown in FIG. 5 has a sirocco fan 181a as a collection of fans functioning as an air supply source, and a duct 181b for branching air supplied from the sirocco fan 181a into a part toward the light control device 90 and apart toward the light modulation unit 50. The air supply device 180 has a control valve 183 for controlling airflow within the duct 181b, and an actuator 295b for rotating the control valve 183 around a rotation shaft PB. The air supply amount of the air supply device 180 is controlled by the air supply control unit 295 as a fan air amount control unit via a fan driving unit 295a.

Figure 6:
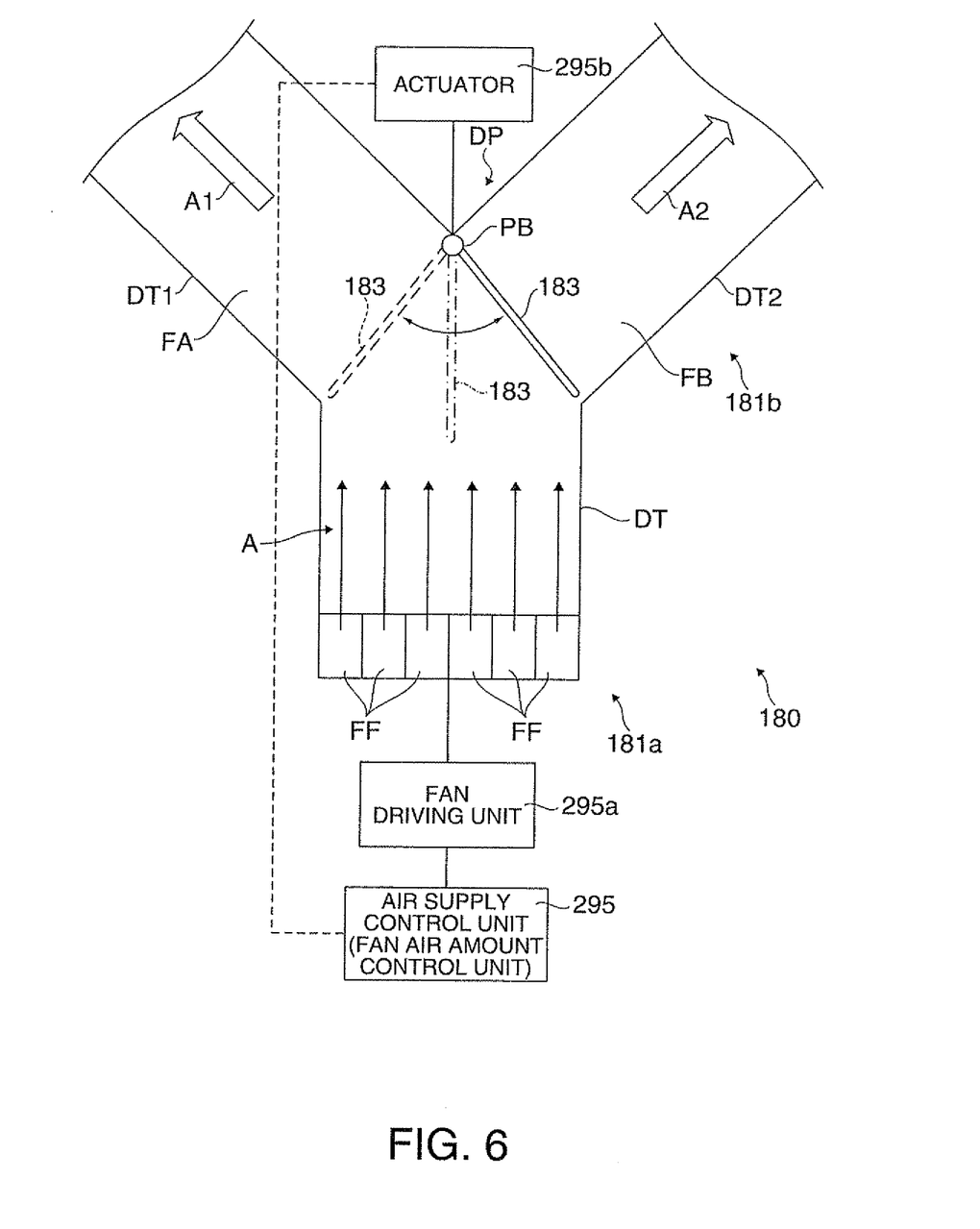
FIG. 6 schematically illustrates an air supply device.

The air supply produced by the air supply control unit 295 and the air supply device 180 is now explained in detail with reference to FIG. 6. The sirocco fan 181a provided as an air supply source having a plurality of small fans FF operates in response to a driving signal from the fan driving unit 295a generated at the time of transmission of a signal from the air supply control unit 295 to the fan driving unit 295a. According to the example shown in the figure, the sirocco fan 181a is constituted by six small fans FF as one air supply source. The duct 181b includes an air supply source side duct portion DT which forms an air supply path for an airflow A generated by the sirocco fan 181a, a first branching duct portion DT1 which forms a first air supply path FA branched at a branching portion DP from the air supply source side duct portion DT to supply air toward the light control device 90, and a second branching duct portion DT2 which forms a second air supply path FB branched at the branching portion DP from the air supply source side duct portion DT to supply air toward the light modulation unit 50.

The small fans FF constituting the sirocco fan 181*a* supplies air in a direction indicated by arrows in the figure. As a result, the airflow A flowing in the uniform direction indicated by the arrows in the figure is generated within the air supply source side duct portion DT. The control valve 183 at the branching portion DP is rotated by the actuator 295*b* around the rotation shaft PB positioned at the branching point of the branching portion DP as a center axis to branch the airflow A into a part on the first branching duct portion DT1 side and a part on the second branching duct portion DT2 side. More specifically, when the control valve 183 is positioned closer to the second branching duct portion DT2 as indicated by a solid line in the figure, for example, most of the airflow A from the six fans FF flows from the branching portion DP toward the first branching duct portion DT1 forming the first air supply path FA, i.e., toward the light control device 90 as an airflow A1. On the other hand, when the control valve 183 is positioned closer to the first branching duct portion DT1 as indicated by a broken line in the figure, most of the airflow A from the six fans FF flows from the branching portion DP toward the second branching duct portion DT2 forming the second air supply path FB, i.e., toward the light modulation unit 50 as an airflow A2. When the control valve 183 is positioned at an intermediate position as indicated by an alternate long and short dash line in the figure, the airflow A from the six fans FF is branched into halves each approximately corresponding to the air amount of the three fans FF and flows toward both the light control device 90 and the light modulation unit 50. Thus, the air supply control unit 295 can control the increase and decrease of the air supply amounts to the light control device 90 and to the light modulation unit 50 while maintaining a constant air supply amount of the sirocco fan 181*a* by appropriately controlling the position of the control valve 183 through operation of the rotation shaft PE driven by the actuator 295*b*.

MODIFIED EXAMPLES AND OTHERS

The invention is not limited to the embodiments described herein but may be practiced otherwise without departing from the scope of the invention. For example, the following modifications may be made.

According to the first embodiment, the driving voltages applied to the first and second fans 81 and 82 are successively varied according to the change of the rotation angles of the first and second light control impellers 91*a* and 91*b*. However, the driving voltages may be switched step by step with several levels. In this case, a plurality of thresholds are established for the rotation angles, and the driving voltages of the first and second fans 81 and 82 are determined based on the respective thresholds.

According to the first embodiment, the air supply control unit 95 controls in such a manner as to decrease the air supply amount to the light control device 90 and increase the air supply amount to the light modulation unit 50 synchronously, and as to increase the air supply amount to the light control device 90 and decrease the air supply amount to the light modulation unit 50 synchronously. However, when the level of the change is not large according to the use condition of the projector 100 or for other reasons, only either of the air supply amounts may be increased or decreased. In this case, the total power consumption can be similarly kept approximately constant when only one of the air supply amounts is not extremely increased or decreased. Thus, the noise generated by the first and second fans 81 and 82 as a whole can be maintained at a constant level regardless of the operational condition of the light control device 90.

In the respective embodiments, the air supply control unit 95 and the like may adjust the air supply amount with slight delay from the change of the rotation angles. In this case, more effective cooling can be provided considering the period from the change of the light shield amount to the time when the effect of the temperature increase starts to be recognized.

According to the first embodiment, the driving voltages of the first and second fans 81 and 82 are controlled such that the total power consumption becomes substantially constant. Thus, the total power consumption can be accurately kept constant by setting the driving voltage applied to the second fan 82 at a value corresponding to the total voltage multiplied by (1−a) when the driving voltage applied to the first fan 81 is determined at a value corresponding to the total power, i.e., the total voltage multiplied by a. However, the air supply amount may be controlled by various methods other than the method described above as long as the total power consumption does not extremely increase but is kept within a certain range. For example, a thermistor may be provided in the vicinity of the light modulation unit 50 such that the second fan air amount control unit 95*b* can determine the driving voltage applied to the second fan 82 based on not only the information from the first fan air amount control unit 95*a* but also the temperature condition detected by the thermistor.

While the air supply devices 80 and 180 are constituted by sirocco fans, the air supply devices 80 and 180 may be other types of fans.

According to the second embodiment, the sirocco fan 181*a* is constituted by the plural small fans FF as an air supply source. However, such a structure which branches airflow from one sirocco fan into the part toward the first branching duct portion DT1 and the part toward the second branching duct portion DT2 by rotating the control valve 183 is allowed.

According to the respective embodiments, the light control device 90 which includes a pair of the light control impellers 91*a* and 91*b* disposed on both sides of the optical path and rotating around the axes AX1 and AX2 is used. However, a light control device having a different structure capable of shielding a part of illumination light to control the amount of light applied to the light modulation device may be employed.

According to the respective embodiments, the example which applies the invention to the projector including the transmission type liquid crystal light valves 50*a*, 50*b*, and 50*c* has been discussed. However, the invention is applicable to a projector including reflection type liquid crystal light valves. The term "transmission type" refers to a type which includes a liquid crystal light valve for transmitting light, and the term "reflection type" refers to a type which includes a liquid crystal light valve for reflecting light.

The structure of the projector shown in FIG. 1 and other figures is applicable to both a front projection type projector which projects images from the projection surface viewing direction and a rear projection type projector which projects images from the direction opposite to the projection surface viewing direction.

The entire disclosure of Japanese Patent Application No. 2010-071021, filed Mar. 25, 2010 is expressly incorporated by reference herein.

What is claimed is:
1. A projector comprising:
an illumination system which has a light source, and a light control unit opened and closed to shield a part of light emitted from the light source;

a light modulation device illuminated by illumination light received from the illumination system;

an air supply device which supplies air to the light control unit and the light modulation device, wherein the air supply device has a first air supply device for supplying air to the light control unit, and a second air supply device for supplying air to the light modulation device, an air supply control unit which decreases an air supply amount to the light modulation device when increasing an air supply amount to the light control unit in accordance with a relatively closed condition of the light control unit, wherein:

the air supply control unit controls the air supply amount to the light control unit and the air supply amount to the light modulation device by adjusting voltage applied to the first air supply device and voltage applied to the second air supply device, and the air supply control unit maintains a substantially constant total power consumption by the first air supply device and the second air supply device by:

increasing a first power consumption of the first air supply device and, at the same time, decreasing a second power consumption of the second air supply device by the same amount by which the first power consumption is increased, and decreasing the first power consumption of the first air supply device and, at the same time, increasing the second power consumption of the second air supply device by the same amount by which the first power consumption is decreased.

2. The projector according to claim 1, wherein the air supply control unit increases the air supply amount to the light modulation device when decreasing the air supply amount to the light control unit in accordance with a relatively opened condition of the light control unit.

3. The projector according to claim 1, wherein:

the light source included in the illumination system switches between a high luminance priority mode and a power saving mode for operation; and the air supply control unit controls the air supply amounts to the light control unit and to the light modulation device when operating at least in the high luminance priority mode.

4. A projector comprising:

an illumination system which has a light source, and a light control unit opened and closed to shield a part of light emitted from the light source;

a light modulation device illuminated by illumination light received from the illumination system; and an air supply device which supplies air to the light control unit and the light modulation device, wherein:

the air supply device has a first air supply device for supplying air to the light control unit, and a second air supply device for supplying air to the light modulation device, an air supply amount from the air supply device to the light control unit becomes larger than before an increase of a light shield amount of the light control unit when the light shield amount of the light control unit increases, and an air supply amount from the air supply device to the light modulation device becomes smaller than before the increase of the light shield amount of the light control unit when the light shield amount of the light control unit increases, the air supply amount to the light control unit and the air supply amount to the light modulation device is controlled by adjusting voltage applied to the first air supply device and voltage applied to the second air supply device, and a substantially constant total power consumption by the first air supply device and the second air supply device is maintained by:

increasing a first power consumption of the first air supply device and, at the same time, decreasing a second power consumption of the second air supply device by the same amount by which the first power consumption is increased, and decreasing the first power consumption of the first air supply device and, at the same time, increasing the second power consumption of the second air supply device by the same amount by which the first power consumption is decreased.

* * * * *

UNITED STATES PATENT AND TRADEMARK OFFICE
CERTIFICATE OF CORRECTION

PATENT NO. : 8,480,236 B2  
APPLICATION NO. : 13/045054  
DATED : July 9, 2013  
INVENTOR(S) : Seiji Tadachi Page 1 of 1

It is certified that error appears in the above-identified patent and that said Letters Patent is hereby corrected as shown below:

On the title page, Item (54) and in the Specification, Col. 1, title, please change "HAVING A LIGHT CONTROL UNIT" to -- PROJECTOR HAVING A LIGHT CONTROL UNIT --.

Signed and Sealed this  
Fifteenth Day of October, 2013

Teresa Stanek Rea  
*Deputy Director of the United States Patent and Trademark Office*